US012677203B2

(12) United States Patent
Stanczak et al.

(10) Patent No.: US 12,677,203 B2
(45) Date of Patent: Jul. 7, 2026

(54) APPARATUS, METHOD, AND COMPUTER PROGRAM

(71) Applicant: Nokia Technologies Oy, Espoo (FI)

(72) Inventors: Jedrzej Stanczak, Wroclaw (PL); Hans Thomas Hohne, Helsinki (FI); Ahmad Awada, Munich (DE); Faranaz Sabouri-Sichani, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 499 days.

(21) Appl. No.: 17/634,594

(22) PCT Filed: Aug. 14, 2019

(86) PCT No.: PCT/EP2019/071781
§ 371 (c)(1),
(2) Date: Feb. 11, 2022

(87) PCT Pub. No.: WO2021/028031
PCT Pub. Date: Feb. 18, 2021

(65) Prior Publication Data
US 2022/0279398 A1 Sep. 1, 2022

(51) Int. Cl.
*H04W 36/30* (2009.01)
*H04W 36/00* (2009.01)
(Continued)

(52) U.S. Cl.
CPC ..... *H04W 36/305* (2018.08); *H04W 36/0072* (2013.01); *H04W 74/04* (2013.01); *H04W 74/0841* (2013.01)

(58) Field of Classification Search
CPC .......... H04W 36/0072; H04W 36/305; H04W 74/0841
See application file for complete search history.

(56) References Cited

U.S. PATENT DOCUMENTS

| | | | |
|---|---|---|---|
| 11,723,063 B2 * | 8/2023 | Islam | H04W 74/0866 |
| | | | 370/329 |
| 2006/0246906 A1 * | 11/2006 | Vaittinen | H04W 36/14 |
| | | | 455/442 |

(Continued)

FOREIGN PATENT DOCUMENTS

| | | |
|---|---|---|
| CN | 101064943 A | 10/2007 |
| CN | 106793148 A | 5/2017 |
| CN | 109392061 A | 2/2019 |
| CN | 109644494 A | 4/2019 |
| WO | WO-2018171756 A1 | 9/2018 |

OTHER PUBLICATIONS

3GPP TSG RAN WG2 Meeting #98, Hangzhou, China May 15-19, 2017, R2-1704768, "RACH procedure during handover in NR", Intel Corporation, 3 pgs.

(Continued)

*Primary Examiner* — James P Duffy
(74) *Attorney, Agent, or Firm* — SQUIRE PATTON BOGGS (US) LLP

(57) ABSTRACT
An apparatus including at least one processor; and at least one memory including computer program code; the at least one memory and the computer program code configured to, with the at least one processor, cause the apparatus at least to: prior to a radio link failure between a serving cell and a terminal, proactively provide an indication indicating at least one resource to perform at least one random access procedure with a neighbouring cell to a terminal.

6 Claims, 11 Drawing Sheets

---

1000 Receiving an indication indicating at least one resource to perform at least one random access procedure with a neighbouring cell from a serving cell

1002 Detecting a radio link failure between a terminal and the serving cell

1004 Using one of the at least one resource to perform one of the at least one random access procedure with the neighbouring cell

(51) Int. Cl.
　　*H04W 74/04*　　　(2009.01)
　　*H04W 74/0833*　　(2024.01)

(56) References Cited

U.S. PATENT DOCUMENTS

2012/0115487 A1 *　5/2012　Josso ................ H04W 36/0079
　　　　　　　　　　　　　　　　　　　　455/437
2014/0078885 A1 *　3/2014　Koskinen .......... H04W 36/0061
　　　　　　　　　　　　　　　　　　　　370/216
2016/0174124 A1 *　6/2016　Basu Mallick ... H04W 36/0005
　　　　　　　　　　　　　　　　　　　　370/331
2016/0262078 A1 *　9/2016　Yao ........................ H04W 36/14
2018/0279375 A1 *　9/2018　Jeon ....................... H04W 72/23
2021/0168678 A1 *　6/2021　Deenoo ............... H04W 36/305

OTHER PUBLICATIONS

3GPP TSG-RAN WG2#104, Spokane, US, Nov. 12-16, 2018, R2-1817398, "Overview on mobility robustness in LTE", Ericsson, 7 pgs.
3GPP TSG-RAN WG2 Meeting #105, Athens, Greece, Feb. 25-Mar. 1, 2019, R2-1900607, "RACH-less HO in beam-based system", 5 pgs.
3GPP TSG-RAN WG2 Meeting #105bis, Xi'an, China, Apr. 8-12, 2019, R2-1904362, "Consideration of 2-stp RACH and RACH-less Enhancement combined with Mobility Enhancement in NR", CMCC, 5 pgs.

* cited by examiner

900 Receive at least one resource to perform at least one random access procedure with a neighbouring cell from the neighbouring cell

902 Provide an indication indicating at least one resource to perform at least one random access procedure with the neighbouring cell to a terminal

904 Detecting a radio link failure between the terminal and a serving cell

1000 Receiving an indication indicating at least one resource to perform at least one random access procedure with a neighbouring cell from a serving cell

1002 Detecting a radio link failure between a terminal and the serving cell

1004 Using one of the at least one resource to perform one of the at least one random access procedure with the neighbouring cell

APPARATUS, METHOD, AND COMPUTER PROGRAM

CROSS REFERENCE TO RELATED APPLICATION

This patent application is a U.S. National Stage application of International Patent Application Number PCT/EP2019/071781 filed Aug. 14, 2019, which is hereby incorporated by reference in its entirety.

FIELD OF THE DISCLOSURE

The present disclosure relates to an apparatus, a method, and a computer program for proactively providing at least one resource to perform at least one random access procedure with a neighbouring cell to a terminal in a cellular network.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is 2G system (2GS) using global system for mobile communications (GSM) radio access technology, 3G system (3GS) using universal mobile telecommunications system (UMTS) radio access technology, 4G system (4GS) using long-term evolution-advanced (LTE-A) radio access technology or 5G system (5GS) using new radio (NR) radio access technology.

SUMMARY

According to an aspect there is provided an apparatus comprising at least one processor and at least one memory including computer code for one or more programs, the at least one memory and the computer code configured, with the at least one processor, to cause the apparatus at least to: prior to a radio link failure between a serving cell and a terminal, proactively provide an indication indicating at least one resource to perform at least one random access procedure with a neighbouring cell to a terminal.

The at least one random access procedure may comprise at least one of (i) a two-step contention based random access procedure, (ii) a two-step contention free random access procedure, or (iii) a legacy contention free random access procedure.

The at least one resource may comprise at least one of a physical uplink shared channel occasion, a physical random access channel occasion or a random access channel preamble.

The physical uplink shared channel occasion may be logically linked to the physical random access channel occasion and/or the random access channel preamble.

The at least one resource to perform the at least one random access procedure may comprise a dedicated resource or a shared resource.

The at least one memory and the computer program code may be configured to, with the at least one processor, cause the apparatus at least to: prior to a radio link failure between the serving cell and the terminal, proactively provide an indication indicating whether the at least one resource comprises a dedicated resource or a shared resource from the neighbouring cell.

The at least one memory and the computer program code may be configured to, with the at least one processor, cause the apparatus at least to: prior to a radio link failure between the serving cell and the terminal, provide an indication indicating whether there are other terminals configured with the same at least one resource and optionally how many of these other terminals.

The at least one resource to perform the at least one random access procedure may be associated with a threshold specific to a reference signal, such as a synchronisation signal block.

The at least one resource to perform the at least one random access procedure may be valid for a limited duration.

The limited duration may be determined by a timer, wherein the timer is predetermined or determined by the neighbouring cell.

The at least one resource to perform the at least one random access procedure may be valid for an unlimited duration.

The terminal may meet at least one of a quality of service requirement, a reliability requirement or a latency requirement.

The at least one memory and the computer program code may be configured to, with the at least one processor, cause the apparatus at least to: prior to the radio link failure between the serving cell and the terminal, proactively receive the at least one resource to perform the at least one random access procedure from the neighbouring cell.

The apparatus may be the serving cell.

According to an aspect there is provided an apparatus comprising circuitry configured to: prior to a radio link failure between a serving cell and a terminal, proactively provide an indication indicating at least one resource to perform at least one random access procedure with a neighbouring cell to a terminal.

The at least one random access procedure may comprise at least one of (i) a two-step contention based random access procedure, (ii) a two-step contention free random access procedure, or (iii) a legacy contention free random access procedure.

The at least one resource may comprise at least one of a physical uplink shared channel occasion, a physical random access channel occasion or a random access channel preamble.

The physical uplink shared channel occasion may be logically linked to the physical random access channel occasion and/or the random access channel preamble.

The at least one resource to perform the at least one random access procedure may comprise a dedicated resource or a shared resource.

The apparatus may comprise circuitry configured to: prior to a radio link failure between the serving cell and the terminal, proactively provide an indication indicating whether the at least one resource comprises a dedicated resource or a shared resource from the neighbouring cell.

The apparatus may comprise circuitry configured to: prior to a radio link failure between the serving cell and the terminal, provide an indication indicating whether there are other terminals configured with the same at least one resource and optionally how many of these other terminals.

The at least one resource to perform the at least one random access procedure may be associated with a threshold specific to a reference signal, such as a synchronisation signal block.

The at least one resource to perform the at least one random access procedure may be valid for a limited duration.

The limited duration may be determined by a timer, wherein the timer is predetermined or determined by the neighbouring cell.

The at least one resource to perform the at least one random access procedure may be valid for an unlimited duration.

The terminal may meet at least one of a quality of service requirement, a reliability requirement or a latency requirement.

The apparatus may comprise circuitry configured to: prior to the radio link failure between the serving cell and the terminal, proactively receive the at least one resource to perform the at least one random access procedure from the neighbouring cell.

The apparatus may be the serving cell.

According to an aspect there is provided an apparatus comprising means for: prior to a radio link failure between a serving cell and a terminal, proactively providing an indication indicating at least one resource to perform at least one random access procedure with a neighbouring cell to a terminal.

The at least one random access procedure may comprise at least one of (i) a two-step contention based random access procedure, (ii) a two-step contention free random access procedure, or (iii) a legacy contention free random access procedure.

The at least one resource may comprise at least one of a physical uplink shared channel occasion, a physical random access channel occasion or a random access channel preamble.

The physical uplink shared channel occasion may be logically linked to the physical random access channel occasion and/or the random access channel preamble.

The at least one resource to perform the at least one random access procedure may comprise a dedicated resource or a shared resource.

The apparatus may comprise means for: prior to a radio link failure between the serving cell and the terminal, proactively providing an indication indicating whether the at least one resource comprises a dedicated resource or a shared resource from the neighbouring cell.

The apparatus may comprise means for: prior to a radio link failure between the serving cell and the terminal, providing an indication indicating whether there are other terminals configured with the same at least one resource and optionally how many of these other terminals.

The at least one resource to perform the at least one random access procedure may be associated with a threshold specific to a reference signal, such as a synchronisation signal block.

The at least one resource to perform the at least one random access procedure may be valid for a limited duration.

The limited duration may be determined by a timer, wherein the timer is predetermined or determined by the neighbouring cell.

The at least one resource to perform the at least one random access procedure may be valid for an unlimited duration.

The terminal may meet at least one of a quality of service requirement, a reliability requirement or a latency requirement.

The apparatus may comprise means for: prior to the radio link failure between the serving cell and the terminal, proactively receiving the at least one resource to perform the at least one random access procedure from the neighbouring cell.

The apparatus may be the serving cell.

According to an aspect there is provided a method comprising: prior to a radio link failure between a serving cell and a terminal, proactively providing an indication indicating at least one resource to perform at least one random access procedure with a neighbouring cell to a terminal.

The at least one random access procedure may comprise at least one of (i) a two-step contention based random access procedure, (ii) a two-step contention free random access procedure, or (iii) a legacy contention free random access procedure.

The at least one resource may comprise at least one of a physical uplink shared channel occasion, a physical random access channel occasion or a random access channel preamble.

The physical uplink shared channel occasion may be logically linked to the physical random access channel occasion and/or the random access channel preamble.

The at least one resource to perform the at least one random access procedure may comprise a dedicated resource or a shared resource.

The method may comprise: prior to a radio link failure between the serving cell and the terminal, proactively providing an indication indicating whether the at least one resource comprises a dedicated resource or a shared resource from the neighbouring cell.

The method may comprise: prior to a radio link failure between the serving cell and the terminal, providing an indication indicating whether there are other terminals configured with the same at least one resource and optionally how many of these other terminals.

The at least one resource to perform the at least one random access procedure may be associated with a threshold specific to a reference signal, such as a synchronisation signal block.

The at least one resource to perform the at least one random access procedure may be valid for a limited duration.

The limited duration may be determined by a timer, wherein the timer is predetermined or determined by the neighbouring cell.

The at least one resource to perform the at least one random access procedure may be valid for an unlimited duration.

The terminal may meet at least one of a quality of service requirement, a reliability requirement or a latency requirement.

The method may comprise: prior to the radio link failure between the serving cell and the terminal, proactively receiving the at least one resource to perform the at least one random access procedure from the neighbouring cell.

The method may be performed by the serving cell.

According to an aspect there is provided a computer program comprising computer executable code which when run on at least one processor is configured to: prior to a radio link failure between a serving cell and a terminal, proactively provide an indication indicating at least one resource to perform at least one random access procedure with a neighbouring cell to a terminal.

The at least one random access procedure may comprise at least one of (i) a two-step contention based random access procedure, (ii) a two-step contention free random access procedure, or (iii) a legacy contention free random access procedure.

The at least one resource may comprise at least one of a physical uplink shared channel occasion, a physical random access channel occasion or a random access channel preamble.

The physical uplink shared channel occasion may be logically linked to the physical random access channel occasion and/or the random access channel preamble.

The at least one resource to perform the at least one random access procedure may comprise a dedicated resource or a shared resource.

The computer program may comprise computer executable code which when run on at least one processor is configured to: prior to a radio link failure between the serving cell and the terminal, proactively provide an indication indicating whether the at least one resource comprises a dedicated resource or a shared resource from the neighbouring cell.

The computer program may comprise computer executable code which when run on at least one processor is configured to: prior to a radio link failure between the serving cell and the terminal, provide an indication indicating whether there are other terminals configured with the same at least one resource and optionally how many of these other terminals.

The at least one resource to perform the at least one random access procedure may be associated with a threshold specific to a reference signal, such as a synchronisation signal block.

The at least one resource to perform the at least one random access procedure may be valid for a limited duration.

The limited duration may be determined by a timer, wherein the timer is predetermined or determined by the neighbouring cell.

The at least one resource to perform the at least one random access procedure may be valid for an unlimited duration.

The terminal may meet at least one of a quality of service requirement, a reliability requirement or a latency requirement.

The computer program may comprise computer executable code which when run on at least one processor is configured to: prior to the radio link failure between the serving cell and the terminal, proactively receive the at least one resource to perform the at least one random access procedure from the neighbouring cell.

The at least one processor may be part of the serving cell.

According to an aspect there is provided an apparatus comprising at least one processor and at least one memory including computer code for one or more programs, the at least one memory and the computer code configured, with the at least one processor, to cause the apparatus at least to: prior to a radio link failure between a serving cell and a terminal, proactively receive at least one indication indicating a resource to perform at least one random access procedure with a neighbouring cell.

The at least one random access procedure may comprise at least one of (i) a two-step contention based random access procedure, (ii) a two-step contention free random access procedure or (iii) a legacy contention free random access procedure.

The at least one resource may comprise at least one of a physical uplink shared channel occasion, a physical random access channel occasion or a random access channel preamble.

The physical uplink shared channel occasion may be logically linked to the physical random access channel occasion and the random access channel preamble.

The at least one resource to perform the at least one random access procedure may comprise a dedicated resource or a shared resource.

The at least one memory and the computer program code may be configured to, with the at least one processor, cause the apparatus at least to: prior to a radio link failure between the serving cell and the terminal, proactively receive an indication indicating whether the at least one resource to perform the at least one random access procedure comprises a dedicated resource or a shared resource from the serving cell.

The at least one memory and the computer program code may be configured to, with the at least one processor, cause the apparatus at least to: prior to a radio link failure between the serving cell and the terminal, receive an indication indicating whether there are other terminals configured with the same at least one resource to perform the at least one random access procedure and optionally how many of these other terminals.

The at least one resource to perform the at least one random access procedure may be associated with a threshold specific to a reference signal, such as a synchronisation signal block.

The at least one memory and the computer program code may be configured to, with the at least one processor, cause the apparatus at least to: use one of the at least one resource to perform one of the at least one random access procedure with the neighbouring cell.

The at least one memory and the computer program code may be configured to, with the at least one processor, cause the apparatus at least to: use a random access channel preamble to perform (iii) a legacy contention free random access procedure, when the at least one resource to perform the at least one random access procedure comprises: a shared physical uplink shared channel occasion to perform (i) a two-step contention based random access procedure or (ii) a two-step contention free random access procedure; and the random access channel preamble to perform (iii) the legacy contention free random access procedure.

The at least one memory and the computer program code may be configured to, with the at least one processor, cause the apparatus at least to: use a physical uplink shared channel occasion to perform (i) a two-step contention based random access channel procedure or (ii) a two-step contention free random access procedure, when the at least one resource to perform the at least one random access channel procedure comprises a physical uplink shared channel occasion to perform (i) the two-step contention based random access procedure or (ii) the two-step contention free random access procedure; and when a threshold specific to a reference signal is met.

The at least one memory and the computer program code may be configured to, with the at least one processor, cause the apparatus at least to: use a random access channel preamble to perform (iii) a legacy contention free random access procedure, when the at least one resource to perform the at least one random access procedure comprises the random access channel preamble to perform (iii) the legacy contention free random access procedure; and when the threshold specific to a reference signal is not met.

The at least one memory and the computer program code may be configured to, with the at least one processor, cause the apparatus at least to: perform (iv) a legacy contention based random access procedure, when the at least one resource to perform the at least one random access procedure does not comprise the random access channel preamble to perform (iii) the legacy contention free random access procedure; and when the threshold specific to a reference signal is not met.

The at least one resource to perform the at least one random access procedure may be valid for a limited duration.

The limited duration may be determined by a timer, wherein the timer is predetermined or determined by the neighbouring cell.

The apparatus may be the terminal.

According to an aspect there is provided an apparatus comprising circuitry configured to: prior to a radio link failure between a serving cell and a terminal, proactively receive at least one indication indicating a resource to perform at least one random access procedure with a neighbouring cell.

The at least one random access procedure may comprise at least one of (i) a two-step contention based random access procedure, (ii) a two-step contention free random access procedure or (iii) a legacy contention free random access procedure.

The at least one resource may comprise at least one of a physical uplink shared channel occasion, a physical random access channel occasion or a random access channel preamble.

The physical uplink shared channel occasion may be logically linked to the physical random access channel occasion and the random access channel preamble.

The at least one resource to perform the at least one random access procedure may comprise a dedicated resource or a shared resource.

The apparatus may comprise circuitry configured to: prior to a radio link failure between the serving cell and the terminal, proactively receive an indication indicating whether the at least one resource to perform the at least one random access procedure comprises a dedicated resource or a shared resource from the serving cell.

The apparatus may comprise circuitry configured to: prior to a radio link failure between the serving cell and the terminal, receive an indication indicating whether there are other terminals configured with the same at least one resource to perform the at least one random access procedure and optionally how many of these other terminals.

The at least one resource to perform the at least one random access procedure may be associated with a threshold specific to a reference signal, such as a synchronisation signal block.

The apparatus may comprise circuitry configured to: use one of the at least one resource to perform one of the at least one random access procedure with the neighbouring cell.

The apparatus may comprise circuitry configured to: use a random access channel preamble to perform (iii) a legacy contention free random access procedure, when the at least one resource to perform the at least one random access procedure comprises: a shared physical uplink shared channel occasion to perform (i) a two-step contention based random access procedure or (ii) a two-step contention free random access procedure; and the random access channel preamble to perform (iii) the legacy contention free random access procedure.

The apparatus may comprise circuitry configured to: use a physical uplink shared channel occasion to perform (i) a two-step contention based random access channel procedure or (ii) a two-step contention free random access procedure, when the at least one resource to perform the at least one random access channel procedure comprises a physical uplink shared channel occasion to perform (i) the two-step contention based random access procedure or (ii) the two-step contention free random access procedure; and when a threshold specific to a reference signal is met.

The apparatus may comprise circuitry configured to: use a random access channel preamble to perform (iii) a legacy contention free random access procedure, when the at least one resource to perform the at least one random access procedure comprises the random access channel preamble to perform (iii) the legacy contention free random access procedure; and when the threshold specific to a reference signal is not met.

The apparatus may comprise circuitry configured to: perform (iv) a legacy contention based random access procedure, when the at least one resource to perform the at least one random access procedure does not comprise the random access channel preamble to perform (iii) the legacy contention free random access procedure; and when the threshold specific to a reference signal is not met.

The at least one resource to perform the at least one random access procedure may be valid for a limited duration.

The limited duration may be determined by a timer, wherein the timer is predetermined or determined by the neighbouring cell.

The apparatus may be the terminal.

According to an aspect there is provided an apparatus comprising means for: prior to a radio link failure between a serving cell and a terminal, proactively receiving at least one indication indicating a resource to perform at least one random access procedure with a neighbouring cell.

The at least one random access procedure may comprise at least one of (i) a two-step contention based random access procedure, (ii) a two-step contention free random access procedure or (iii) a legacy contention free random access procedure.

The at least one resource may comprise at least one of a physical uplink shared channel occasion, a physical random access channel occasion or a random access channel preamble.

The physical uplink shared channel occasion may be logically linked to the physical random access channel occasion and the random access channel preamble.

The at least one resource to perform the at least one random access procedure may comprise a dedicated resource or a shared resource.

The apparatus may comprise means for: prior to a radio link failure between the serving cell and the terminal, proactively receiving an indication indicating whether the at least one resource to perform the at least one random access procedure comprises a dedicated resource or a shared resource from the serving cell.

The apparatus may comprise means for: prior to a radio link failure between the serving cell and the terminal, receiving an indication indicating whether there are other terminals configured with the same at least one resource to perform the at least one random access procedure and optionally how many of these other terminals.

The at least one resource to perform the at least one random access procedure may be associated with a threshold specific to a reference signal, such as a synchronisation signal block.

The apparatus may comprise means for: using one of the at least one resource to perform one of the at least one random access procedure with the neighbouring cell.

The apparatus may comprise means for: using a random access channel preamble to perform (iii) a legacy contention free random access procedure, when the at least one resource to perform the at least one random access procedure comprises: a shared physical uplink shared channel occasion to perform (i) a two-step contention based random access procedure or (ii) a two-step contention free random access procedure; and the random access channel preamble to perform (iii) the legacy contention free random access procedure.

The apparatus may comprise means for: using a physical uplink shared channel occasion to perform (i) a two-step contention based random access channel procedure or (ii) a two-step contention free random access procedure, when the at least one resource to perform the at least one random access channel procedure comprises a physical uplink shared channel occasion to perform (i) the two-step contention based random access procedure or (ii) the two-step contention free random access procedure; and when a threshold specific to a reference signal is met.

The apparatus may comprise means for: using a random access channel preamble to perform (iii) a legacy contention free random access procedure, when the at least one resource to perform the at least one random access procedure comprises the random access channel preamble to perform (iii) the legacy contention free random access procedure; and when the threshold specific to a reference signal is not met.

The apparatus may comprise means for: performing (iv) a legacy contention based random access procedure, when the at least one resource to perform the at least one random access procedure does not comprise the random access channel preamble to perform (iii) the legacy contention free random access procedure; and when the threshold specific to a reference signal is not met.

The at least one resource to perform the at least one random access procedure may be valid for a limited duration.

The limited duration may be determined by a timer, wherein the timer is predetermined or determined by the neighbouring cell.

The apparatus may be the terminal.

According to an aspect there is provided a method comprising: prior to a radio link failure between a serving cell and a terminal, proactively receiving at least one indication indicating a resource to perform at least one random access procedure with a neighbouring cell.

The at least one random access procedure may comprise at least one of (i) a two-step contention based random access procedure, (ii) a two-step contention free random access procedure or (iii) a legacy contention free random access procedure.

The at least one resource may comprise at least one of a physical uplink shared channel occasion, a physical random access channel occasion or a random access channel preamble.

The physical uplink shared channel occasion may be logically linked to the physical random access channel occasion and the random access channel preamble.

The at least one resource to perform the at least one random access procedure may comprise a dedicated resource or a shared resource.

The method may comprise: prior to a radio link failure between the serving cell and the terminal, proactively receiving an indication indicating whether the at least one resource to perform the at least one random access procedure comprises a dedicated resource or a shared resource from the serving cell.

The method may comprise: prior to a radio link failure between the serving cell and the terminal, receiving an indication indicating whether there are other terminals configured with the same at least one resource to perform the at least one random access procedure and optionally how many of these other terminals.

The at least one resource to perform the at least one random access procedure may be associated with a threshold specific to a reference signal, such as a synchronisation signal block.

The method may comprise: using one of the at least one resource to perform one of the at least one random access procedure with the neighbouring cell.

The method may comprise: using a random access channel preamble to perform (iii) a legacy contention free random access procedure, when the at least one resource to perform the at least one random access procedure comprises: a shared physical uplink shared channel occasion to perform (i) a two-step contention based random access procedure or (ii) a two-step contention free random access procedure; and the random access channel preamble to perform (iii) the legacy contention free random access procedure.

The method may comprise: using a physical uplink shared channel occasion to perform (i) a two-step contention based random access channel procedure or (ii) a two-step contention free random access procedure, when the at least one resource to perform the at least one random access channel procedure comprises a physical uplink shared channel occasion to perform (i) the two-step contention based random access procedure or (ii) the two-step contention free random access procedure; and when a threshold specific to a reference signal is met.

The method may comprise: using a random access channel preamble to perform (iii) a legacy contention free random access procedure, when the at least one resource to perform the at least one random access procedure comprises the random access channel preamble to perform (iii) the legacy contention free random access procedure; and when the threshold specific to a reference signal is not met.

The method may comprise: performing (iv) a legacy contention based random access procedure, when the at least one resource to perform the at least one random access procedure does not comprise the random access channel preamble to perform (iii) the legacy contention free random access procedure; and when the threshold specific to a reference signal is not met.

The at least one resource to perform the at least one random access procedure may be valid for a limited duration.

The limited duration may be determined by a timer, wherein the timer is predetermined or determined by the neighbouring cell.

The method may be performed by the terminal.

According to an aspect there is provided a computer program comprising computer executable code which when run on at least one processor is configured to: prior to a radio link failure between a serving cell and a terminal, proactively receive at least one indication indicating a resource to perform at least one random access procedure with a neighbouring cell.

The at least one random access procedure may comprise at least one of (i) a two-step contention based random access procedure, (ii) a two-step contention free random access procedure or (iii) a legacy contention free random access procedure.

The at least one resource may comprise at least one of a physical uplink shared channel occasion, a physical random access channel occasion or a random access channel preamble.

The physical uplink shared channel occasion may be logically linked to the physical random access channel occasion and the random access channel preamble.

The at least one resource to perform the at least one random access procedure may comprise a dedicated resource or a shared resource.

The computer program may comprise computer executable code which when run on at least one processor is configured to: prior to a radio link failure between the serving cell and the terminal, proactively receive an indication indicating whether the at least one resource to perform the at least one random access procedure comprises a dedicated resource or a shared resource from the serving cell.

The computer program may comprise computer executable code which when run on at least one processor is configured to: prior to a radio link failure between the serving cell and the terminal, receive an indication indicating whether there are other terminals configured with the same at least one resource to perform the at least one random access procedure and optionally how many of these other terminals.

The at least one resource to perform the at least one random access procedure may be associated with a threshold specific to a reference signal, such as a synchronisation signal block.

The computer program may comprise computer executable code which when run on at least one processor is configured to: use one of the at least one resource to perform one of the at least one random access procedure with the neighbouring cell.

The computer program may comprise computer executable code which when run on at least one processor is configured to: use a random access channel preamble to perform (iii) a legacy contention free random access procedure, when the at least one resource to perform the at least one random access procedure comprises: a shared physical uplink shared channel occasion to perform (i) a two-step contention based random access procedure or (ii) a two-step contention free random access procedure; and the random access channel preamble to perform (iii) the legacy contention free random access procedure.

The computer program may comprise computer executable code which when run on at least one processor is configured to: use a physical uplink shared channel occasion to perform (i) a two-step contention based random access channel procedure or (ii) a two-step contention free random access procedure, when the at least one resource to perform the at least one random access channel procedure comprises a physical uplink shared channel occasion to perform (i) the two-step contention based random access procedure or (ii) the two-step contention free random access procedure; and when a threshold specific to a reference signal is met.

The computer program may comprise computer executable code which when run on at least one processor is configured to: use a random access channel preamble to perform (iii) a legacy contention free random access procedure, when the at least one resource to perform the at least one random access procedure comprises the random access channel preamble to perform (iii) the legacy contention free random access procedure; and when the threshold specific to a reference signal is not met.

The computer program may comprise computer executable code which when run on at least one processor is configured to: perform (iv) a legacy contention based random access procedure, when the at least one resource to perform the at least one random access procedure does not comprise the random access channel preamble to perform (iii) the legacy contention free random access procedure; and when the threshold specific to a reference signal is not met.

The at least one resource to perform the at least one random access procedure may be valid for a limited duration.

The limited duration may be determined by a timer, wherein the timer is predetermined or determined by the neighbouring cell.

The at least one processor may be part of the terminal.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AUSF: Authentication Server Function
AMF: Access and Mobility Management Function
BMF: Beam Failure Recovery CBRA: Contention Based Random Access
CFRA: Contention Free Random Access
CE: Control Element
C-RNTI: Cell-Radio Network Temporary Identifier
CU: Centralized Unit
DL: Downlink
DN: Data Network
DU: Distributed Unit
E-UTRAN: Evolved Universal Terrestrial Radio Access
    Network
gNB: gNodeB
GSM: Global System for Mobile communication
IIoT: Industrial IoT
IoT: Internet of Things
IP: Internet Protocol
LTE: Long Term Evolution
MAC: Medium Access Control
MBB: Mobile BroadBand
MS: Mobile Station
MsgA: Message A
MsgB: Message B
Msg1: Message 1
Msg2: Message 2
Msg3: Message 3
Msg4: Message 4
NEF: Network Exposure Function
NR: New Radio
PDA: Personal Digital Assistant
PUSCH: Physical Uplink Shared Channel
PRACH Physical Random Access Channel
RACH: Random Access Channel
RAR: Random Access Response
QoS: Quality of Service
RAM: Random Access Memory
RAN: Radio Access Network
RAR: Random Access Response
RLC: Radio Link Control
RLF: Radio Link Failure
ROM: Read Only Memory
RRC: Radio Resource Control
RS: Reference Signal
SCell: Secondary Cell
SI: System Information
SMF: Session Management Function
SSB: Synchronization Signal Block
TMSI: Temporary Mobile Subscriber Identity
UE: User Equipment
UL: Uplink
UMTS: Universal Mobile Telecommunication System
URLLC: Ultra Reliable Low Latency Communication
USB: Universal Serial Bus
WI: Work Item
3G: $3^{rd}$ Generation
3GPP: $3^{rd}$ Generation Partnership Project
4G: $4^{th}$ Generation
5G: $5^{th}$ Generation
5GC: 5G Core network
5GRAN: 5G Radio Access Network
5GS: 5G System
5QI: 5G QoS Indicator

BRIEF DESCRIPTION OF THE FIGURES

Embodiments will now be described, by way of example
only, with reference to the accompanying Figures in which.

DETAILED DESCRIPTION OF THE FIGURES

Figure 1:
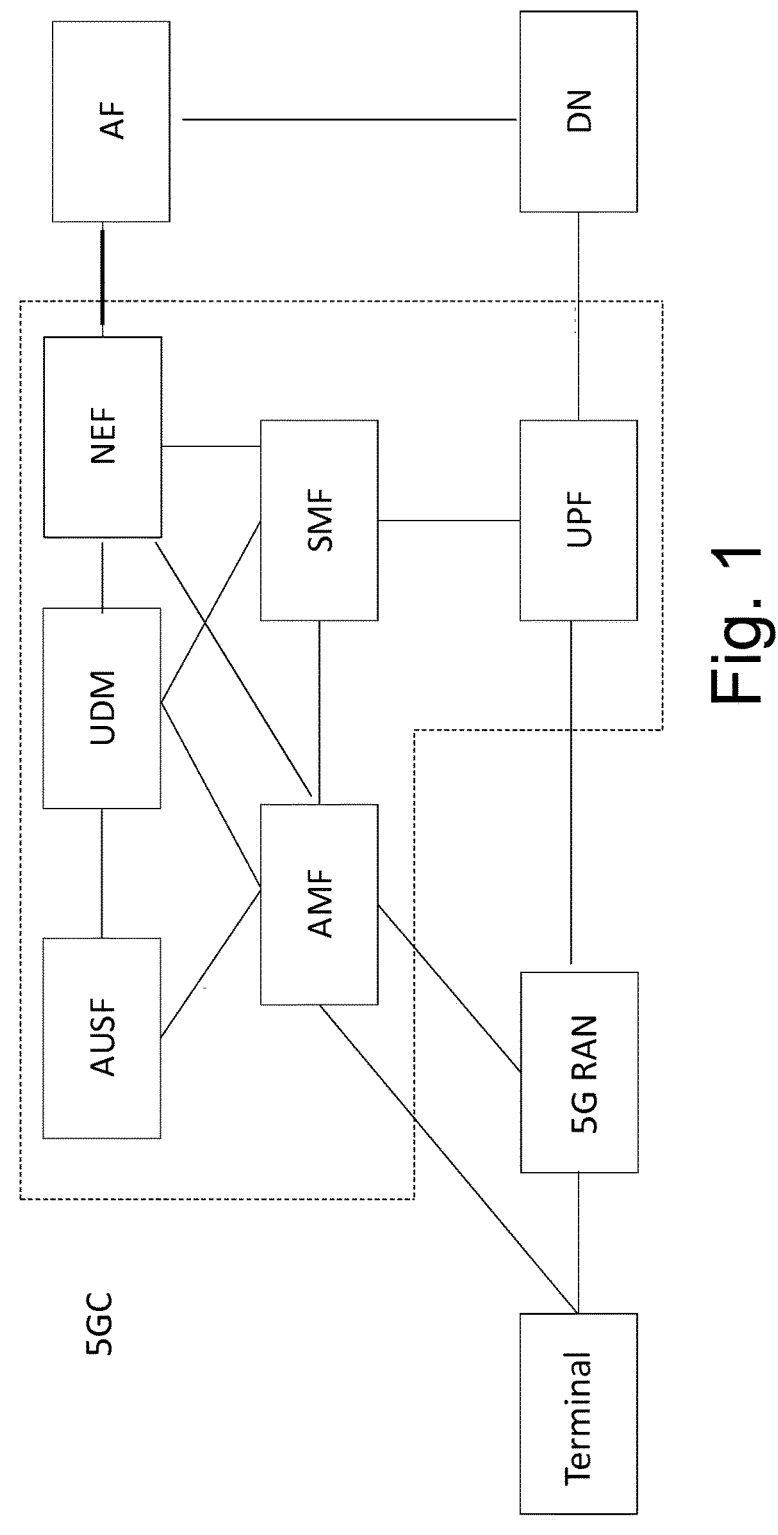
FIG. 1 shows a schematic representation of a 5G system
(5GS)
Figure 2:
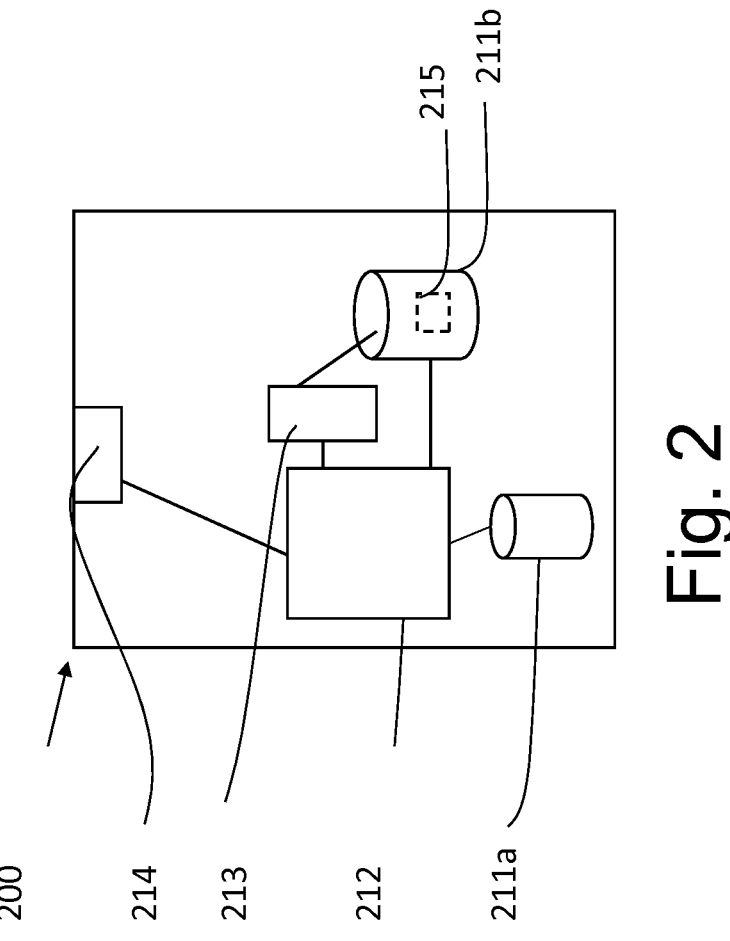
FIG. 2 shows a schematic representation of a control
apparatus.

In the following certain embodiments are explained with
reference to mobile communication devices capable of com-
munication via a wireless cellular system and mobile com-
munication systems serving such mobile communication
devices. Before explaining in detail the exemplifying
embodiments, certain general principles of a wireless com-
munication system, access systems thereof, and mobile
communication devices are briefly explained with reference
to FIGS. 1, 2 and 3 to assist in understanding the technology
underlying the described examples.
    FIG. 1 shows a schematic representation of a 5G system
(5GS). The 5GS may comprise a terminal (UE), a 5G radio
access network (5G RAN), a 5G core network (5GC), one or
more application function (AF) and one or more data
networks (DN).
    The 5G RAN may comprise one or more gNodeB (gNB)
and/or distributed unit functions connected to one or more
gNodeB (gNB) centralized unit functions.
    The 5GC may comprise an access and mobility manage-
ment function (AMF), a session management function
(SMF), an authentication server function (AUSF), a user
data management (UDM), a user plane function (UPF)
and/or a network exposure function (NEF).
    FIG. 2 illustrates an example of a control apparatus 200
for controlling a function of the 5G RAN or 5GC as
illustrated on FIG. 1. The control apparatus may comprise at
least one random access memory (RAM) 211a, at least on
read only memory (ROM) 211b, at least one processor 212,
213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function the 5G RAN or 5GC. In some embodiments, each function of the 5G RAN or 5GC comprises a control apparatus 200. In alternative embodiments, two or more functions of the 5G RAN or 5GC may share a control apparatus.

Figure 3:
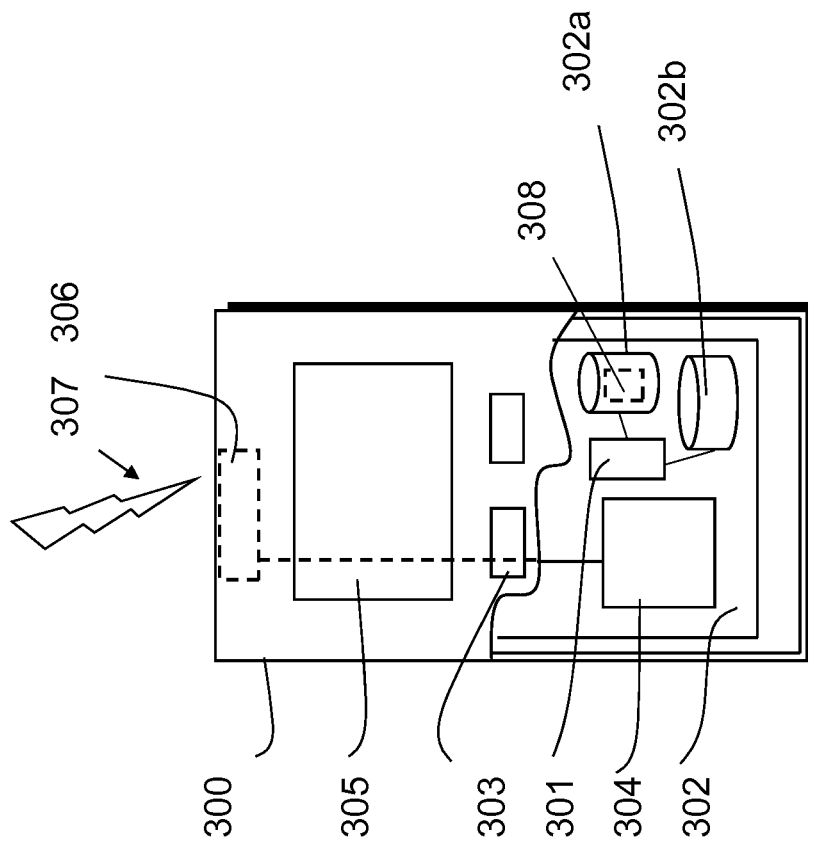
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 211a and the ROM 211b. The at least one processor 301 may be configured to execute an appropriate software code 308. The software code 308 may for example allow to perform one or more of the present aspects. The software code 308 may be stored in the ROM 211b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

Although one or more aspects of this disclosure relate to a 5GS, it will be understood that similar aspects may relate to other systems.

A UE in RRC_CONNECTED mode may encounter a radio link failure (RLF) when one or more criteria are met. As per 3GPP TS 38.300 (Release 15) these criteria may comprise an expiry of a timer started after indication of radio problems from a physical layer (if radio problems are recovered before the timer is expired, the UE stops the timer), a random access procedure failure or a radio link control (RLC) failure (see section 9.2.7). A reason behind RLF may be radio level problems indicated by the physical layer. When RLF occurs, the UE may stay in RRC_CONNECTED mode and may attempt connection re-establishment with a neighbouring target cell In case such neighbouring target cell is not found or re-establishment fails, the UE may move to RRC_IDLE mode and the entire procedure of establishing the RRC connection may be initiated from the scratch.

One part of RRC re-establishment is random access procedure to the neighbouring target cell. In the following, we provide background information on legacy contention-based random access (CBRA) procedure and legacy contention free (CFRA) random access procedure. These procedures are discussed in 3GPP NR (Release 15.

As per 3GPP TS 38.300 (Release 15) a random access procedure may be triggered by a number of events, for instance: initial access from RRC_IDLE mode, RRC Connection Re-establishment procedure, handover, downlink (DL) or uplink (UL) data arrival during RRC_CONNECTED mode when UL synchronisation status is "non-synchronised", transition from RRC_INACTIVE mode, to establish time alignment at secondary cell (SCell) addition, request for other system information (SI) or beam failure recovery (see section 9.2.6).

Figure 4:
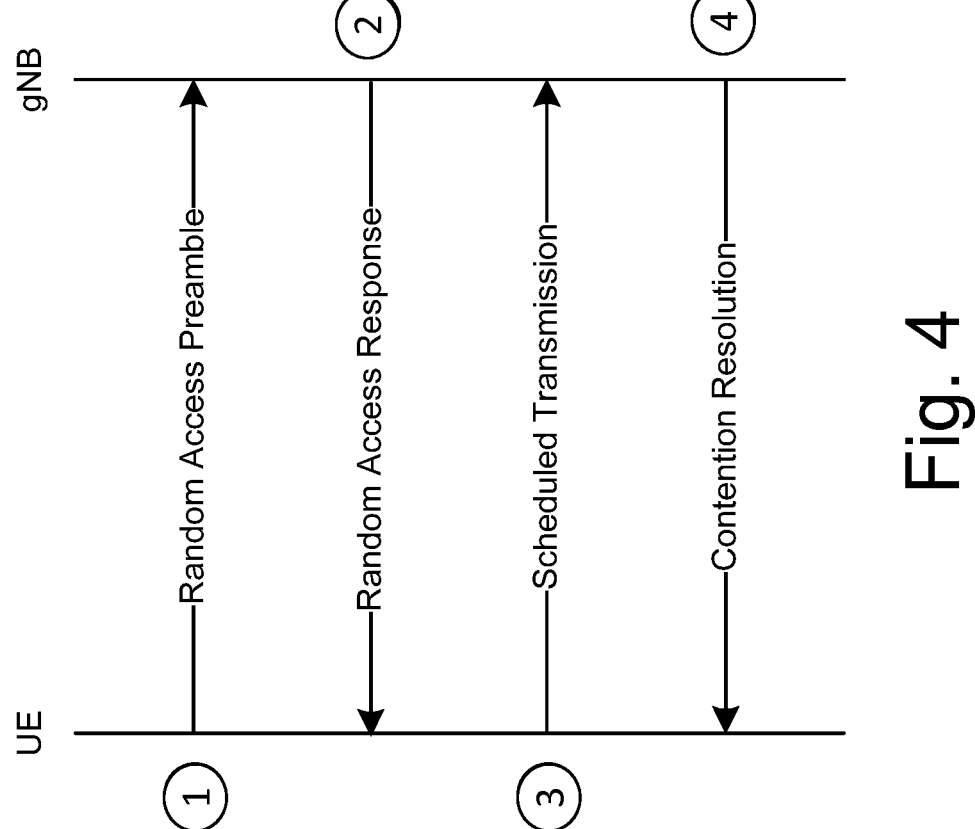
FIG. 4 shows a schematic representation of a signalling
diagram of a legacy contention based random access pro-
cedure.

FIG. 4 shows a schematic representation of a signalling diagram of a legacy CBRA procedure.

In step 1, a UE may select a RACH preamble out of a configured set of RACH preambles. The UE may transmit the RACH preamble in one of a plurality of predetermined RACH occasions.

In step 2, a gNB may send a Random Access Response (RAR). The RAR may be generated by Medium Access Control (MAC) layer. The RAR may provide at least one of a timing advance, initial UL grant to send a message 3 (Msg3) and an assignment of temporary Cell-Radio Network Temporary Identifier (C-RNTI).

In step 3, using the UL grant provided in RAR, the UE may send the Msg 3 to the gNB. The content for Msg3 may depends on whether the UE performs initial access (Msg 3 may comprise an RRCSetupRequest), RRC re-establishment (Msg 3 may comprise RRCReestablishment), handover (Msg 3 may comprise RRCReconfigurationComplete) or beam failure recovery (Msg 3 may comprise C-RNTI MAC CE) as per 3GPP TS 38.331 (Release 15).

In step 4, contention resolution may be performed in message 4 (Msg4). In the event that the UE loses the contention (e.g. due to possible collision in RACH preamble transmissions with another UE), the UE may repeat the legacy CBRA procedure.

Figure 5:
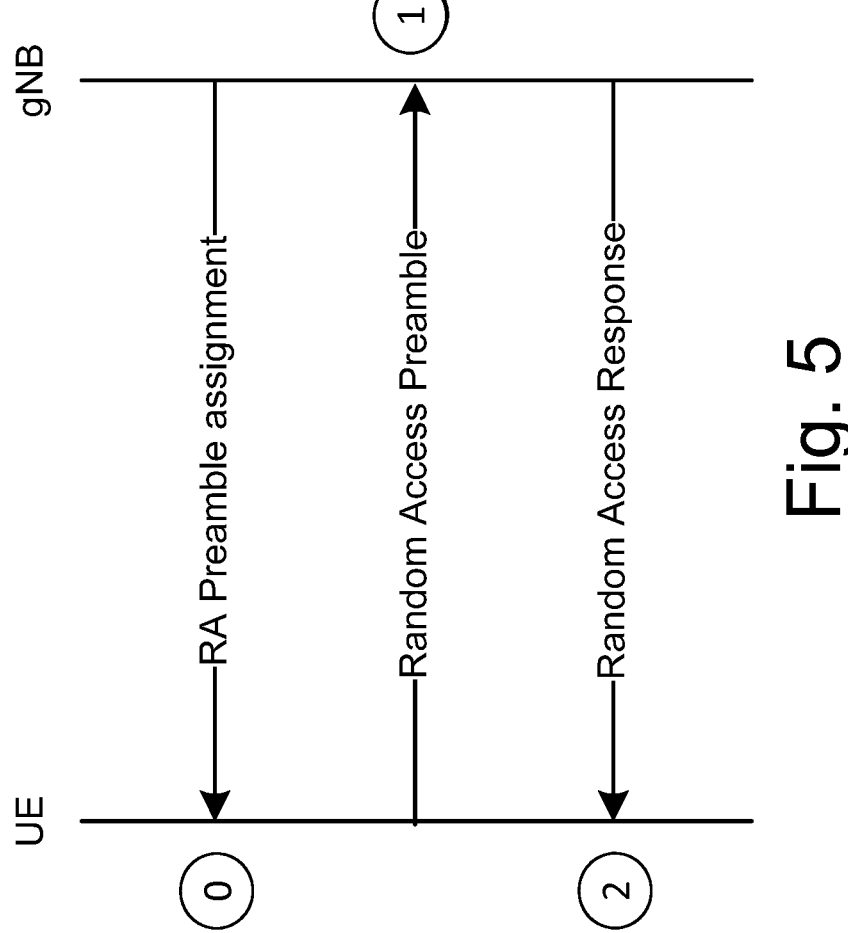
FIG. 5 shows a schematic representation of a signalling
diagram of a legacy contention free random access proce-
dure.

FIG. 5 shows a schematic representation of a signalling diagram of a legacy CFRA procedure.

In step 0, a gNB may configure a UE with a dedicated RACH preamble. This may be done with a handover Command.

In step 1, when performing the legacy CFRA procedure, the UE may transmit the dedicated RACH preamble in one of pre-configured RACH occasions.

In step 2, the legacy CFRA procedure may be completed when UE successfully receives the RAR.

In work item (WI) description RP-182894, a two-step CBRA procedure is discussed for 3GPP NR (Release 16). The WI aims to specify the two-step CBRA procedure as general MAC procedure covering both physical layer and higher layer aspects. Two-step CBRA procedure may reduce the latency as compared to the legacy CBRA procedure (Release 15). The two-step CBRA procedure targets general random access procedure for different use cases in IDLE, INACTIVE as well as CONNECTED RRC modes. Hence, this approach may reduce the interruption time spent on random access procedure.

Only two-step CBRA procedure has so far being specified. Possible extensions to two-step CFRA procedure may be considered in future Releases (supposedly from Release 17 onwards). All triggers for Release15 NR listed above may also be applied for two-step CBRA procedure and/or two-step CFRA procedure except for SI Request and Beam Failure Recovery (BFR) which may still be under discussion in RAN2. No new trigger for two-step CBRA procedure and/or two-step CFRA procedure may be considered.

Basically, the two-step CBRA procedure may condense the preamble and Msg3 from the legacy CBRA procedure into a message A (MsgA). MsgA may comprise a RACH preamble sent on a physical random access channel (PRACH) occasion and a payload sent on a physical uplink shared channel (PUSCH) occasion.

Figure 6:
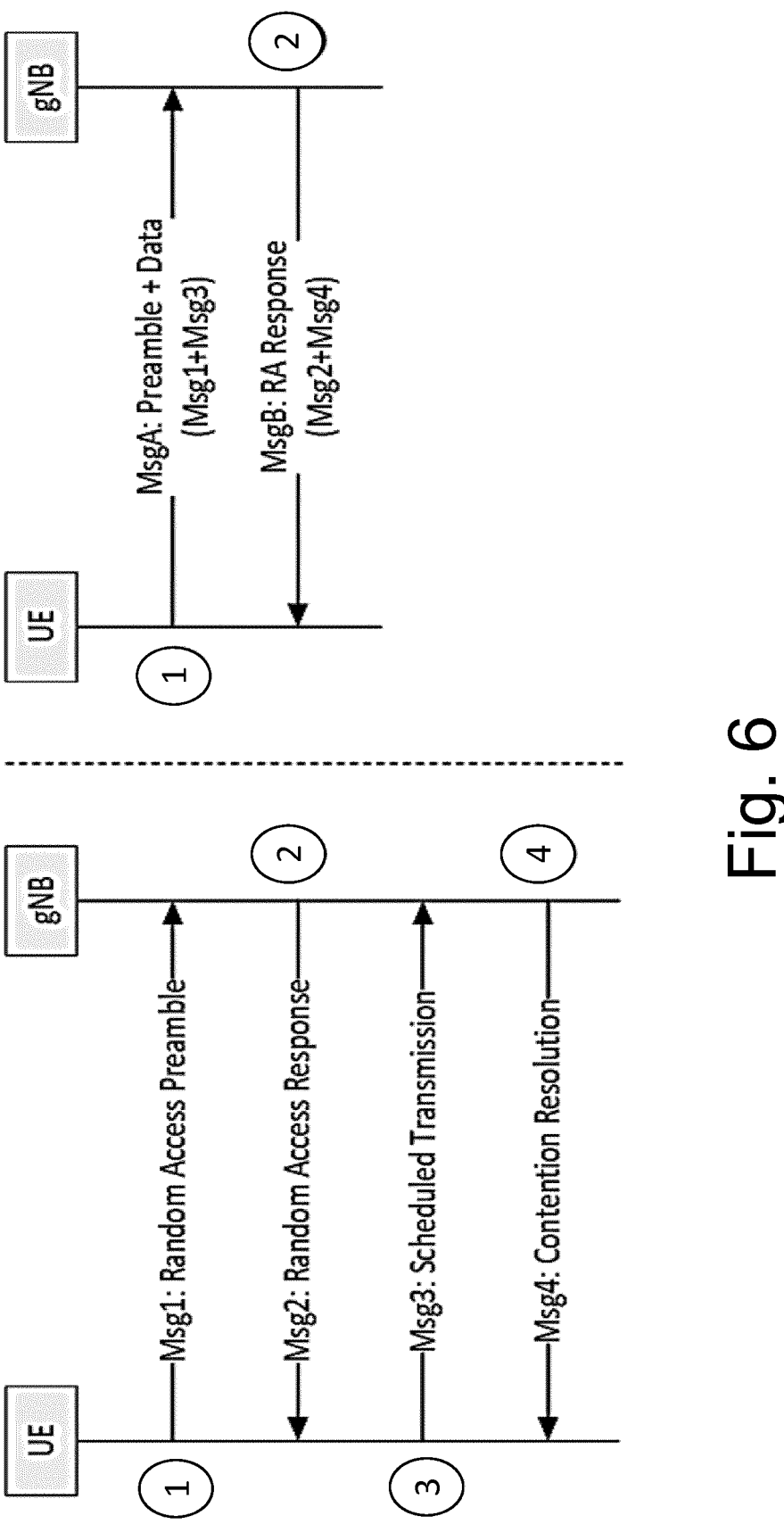
FIG. 6 shows a schematic representation of a signalling
diagram of a legacy contention based random access pro-
cedure and a signalling diagram of a two-step contention
based random access procedure.

Similarly, RAR and Msg4 from legacy CBRA procedure may be condensed into a single message B (MsgB). The two-step CBRA procedure is shown on FIG. 6 together with the legacy CBRA procedure.

The RACH preamble sent on the PRACH occasion and the payload sent on the PUSCH occasion may be associated together. Each RACH preamble may have a mapping in time and/or frequency to a respective PUSCH occasion. The payload sent on the PUSCH occasion may identify a UE (e.g. Temporary Mobile Subscriber Identity (TMSI)) and/or a reason for initiating the two-step CBRA procedure.

The RACH preamble may be one of a configured set of known orthogonal sequences (e.g. Zadoff Chu). The RACH preamble may be easy to detect because of the orthogonality, even when it is transmitted without prior knowledge of a timing advance and/or a required power level.

By contrast, when the payload is sent without prior knowledge of a timing advance or a required power level there may be a higher probability that it will not be decoded correctly by the gNB as compared to the RACH preamble. This may lead to a higher probability of delay in completing the two-step CBRA procedure as the UE may have to retry with higher power levels until the entire MsgA is finally decoded by the gNB.

The two-step CFRA procedure may not differ much from the two-step CBRA procedure. A difference may be the fact that dedicated RACH preambles may be pre-assigned, before executing the two steps of the two-step CBRA procedure (similarly to the legacy CFRA procedure).

One or more of aspects of this disclosure aim at accelerating the process of connection re-establishment upon RLF. Such optimization may be of utmost importance especially for the upcoming, highly-demanding services, such as Ultra Reliable Low Latency Communication (URLLC), Industrial IoT (IIoT), etc. where RLFs shall be primarily avoided and recovered immediately if occurred.

Currently available techniques for mitigating the negative effects of RLF merely assume the network restores UE's context which can to some extent reduce the latency introduced by the entire process. This may be an acceptable trade-off between the complexity, resource reservation/wastage and achievable performance for Mobile Broadband (MBB) services. Nevertheless, such behaviour may not suffice for demanding use-cases, where RLFs shall be avoided at all costs, but once they occur, the recovery process shall be as prompt and effective as possible.

Several re-establishment enhancements have been proposed in 3GPP RAN WG2 papers, submitted to the meetings handling Release16 NR work. For example, the following R2-1900611 "Considerations on failure recovery in NR" pointed out the possibility to proactively provide SI of a target cell so that in case of RLF the time consumed by the need to acquire the SI may be reduced:

This enhancement may accelerate the neighbouring target cell selection step of re-establishment procedure but may not reduce the delay caused by the legacy CBRA procedure which is subject to collision and RACH preamble re-transmissions and requires four signaling messages between UE and neighbouring target cell before any user data exchange can be started.

Another proposed re-establishment enhancement has been to configure a neighbouring target cell supporting the two-step CBRA procedure for a UE in RRC_IDLE mode or RRC_CONNECTED mode to perform the two-step CBRA procedure during RRC re-establishment. The UE performing RRC re-establishment may have to acquire the essential SI of the neighbouring target cell before performing the two-step CBRA procedure. This may however be expensive in terms of radio resources since enabling the two-step CBRA procedure for a UE in RRC_IDLE mode may require reserving permanently common PUSCH resources which may not be used when, for example, the UE in RRC_IDLE mode does not perform the two-step CBRA procedure.

One or more of aspects of this disclosure propose to accelerate a random access procedure during RRC re-establishment by proactively providing UL grants/configurations including:

(1) PUSCH occasions to perform the two-step CBRA procedure or a two-step CFRA procedure;

(2) PRACH occasions to perform the two-step CBRA procedure, the two-step CFRA procedure or the legacy CFRA procedure; and/or (3) RACH preambles to perform the two-step CFRA procedure or the legacy CFRA procedure.

The PUSCH occasions, PRACH occasions and/or RACH preambles may comprise dedicated and/or shared PUSCH occasions, PRACH occasions and/or RACH preambles.

The PUSCH occasions, PRACH occasions and/or RACH preambles may be for a selected class/group of UEs in RRC_CONNECTED mode (e.g. UEs requiring quick recovery).

The PUSCH occasions, PRACH occasions and/or RACH preambles may be provided for a limited time duration. Namely, these PUSCH occasions, PRACH occasions and/or RACH preambles may be released by the network and/or the UEs implicitly after a timer expiry or upon the UEs successfully completing a handover or re-establishment procedure (more details can be found below).

As per 3GPP TS 38.331, upon a RLF the UE may perform the RRC connection re-establishment procedure. This procedure may be executed faster if the UE can take advantage of PUSCH occasions, PRACH occasions and/or RACH preambles for accessing a neighbouring target cell chosen during the RRC connection re-establishment procedure.

PUSCH occasions may refer to time and/or frequency resources on PUSCH (MsgA/PUSCH configuration) as discussed in 3GPP two-step RACH WI (description in RP-182894). By being configured with such PUSCH occasions in advance, the UE may attempt to use it immediately upon detecting the RLF (i.e. before/instead of initiating the re-establishment procedure as per legacy steps).

The validity of a PUSCH occasions, PRACH occasions and/or RACH preambles may be time constrained and for example controlled by a timer. Upon timer expiry, the network and/or the UE may discard the PUSCH occasions, PRACH occasions and/or the RACH preambles. Afterwards, in case RLF occurs, the UE may follow a legacy behaviour, unless explicitly configured once again. By default, the PUSCH occasions, PRACH occasions and/or RACH preambles may be released by the network and/or the UE once the UE successfully completes a handover from a serving cell to a neighbouring target cell and/or the UE re-establishes connection to a neighbouring target cell.

PUSCH occasions and/or PRACH occasions may be periodic/semi-persistent, for example in case a neighbouring cell is able to ensure such lavish resource reservation, with the high likelihood some or even all of those PUSCH occasions and/or PRACH occasions may be wasted. This may be acceptable for demanding services, requiring high-reliability and low latency at the expense of non-optimal resource utilization/assignment.

PUSCH occasions, PRACH occasions and/or a RACH preambles may be specifically assigned to a single UE or shared among multiple UEs (i.e. the same PUSCH occasions, PRACH occasions and/or RACH preambles provided to multiple UEs). In case of the latter, additional indication may be provided by a neighbouring cell to a serving cell. When the PUSCH occasions, PRACH occasions and/or RACH preambles are proactively provided to the UE, the UE may also be informed whether the PUSCH occasions, PRACH occasions and/or the RACH preambles are dedicated or shared (and the UE may expect other UEs to use the same PUSCH occasions, PRACH occasions and/or to send the same RACH preambles. This may further impact the decision process in the UE on which backup option to choose when RLF is encountered. RLF may be equivalent to T310 expiry as defined in 3GPP TS 38.331. For a shared PUSCH occasions, PRACH occasions and/or a RACH preambles for a UE, the underlying resource allocation at the neighbouring cell may not be released by the network based only on one UE successfully completing a handover or re-establishment, but may be kept for other UEs. Shared PUSCH occasions, PRACH occasions and/or a RACH preambles lend themselves also to not require timers and be semi-persistent.

PUSCH occasions, PRACH occasions and/or RACH preambles may also be associated with a threshold specific to a reference signal (RS), such as a synchronization signal block (SSB). Only when measurements on this particular RS are above the threshold, the UE may use the proactively provided occasions, PRACH occasions and/or RACH preambles for a neighbouring cell.

RACH preambles may be configured by the serving cell and may relate to a number of neighbouring cells. The RACH preambles may be used in particular for the neighbouring cells which do not support the access via the two-step CBRA procedure or the two-step CFRA procedure. The UE may check if for the same neighbouring cell it has a PUSCH occasions, PRACH occasions and/or RACH preambles. The neighbouring target cell selection may be done by the UE following a clearly defined order.

RACH preambles may be provided for executing the two-step CFRA procedure.

Unlike R2-1900611, this disclosure does not propose to provision an entire SI blocks (common to all UEs and with other unnecessary elements), but to have the possibility to configure most demanding UEs (in terms of the QoS/reliability/latency requirements) with backup PUSCH occasions, PRACH occasions and/or RACH preambles for accelerating the re-establishment process, to be executed upon RLF.

One or more aspects of this disclosure relate to inter-cell exchange of (periodic/semi-persistent or dynamic) PUSCH occasions and/or PRACH occasions over Xn interface. The inter-cell exchange may take place between one or more neighbouring cells and a serving cell. This may possibly impact 3GPP TS 38.423

One or more aspects of this disclosure relate to providing an indication to a UE whether PUSCH occasions, PRACH occasions and/or RACH preambles are exclusively assigned to the UE or shared with other UEs. This may impact 3GPP TS 38.331 and more particularly a PUSCH-Config information element. One-bit indication may be inserted into the PUSCH-Config information element to inform the UE if the same PUSCH occasions have been also reserved for any other UE.

One or more aspects of this disclosure relate to proposing a new procedure for handling RLF in case proactive preparation from one or more neighbouring cells was done prior to RLF. This may impact 3GPP TS 38.331 and more particularly the procedure for RRC Connection Re-establishment (section 5.3.7) may be enhanced as follows

---

1>if the UE has been configured with proactiveULgrant for the neighbouring
cell and concerned cell fulfils cell suitability criteria (as defined in TS 38.304)
  2> initiate UL transmission of MsgA to selected cell applying the PUSCH-
  Config provided in proactiveULgrant from the last serving cell

---

One or more aspects of this disclosure relate to configuring the network with a timer (e.g. T3xx) to control the validity of PUSCH occasions, PRACH occasions and/or RACH preambles. The timer may either be initiated by each neighbouring cell when PUSCH occasions, PRACH occasions and/or RACH preambles are provided/committed to the serving cell. Alternatively, the timer may be started only when the serving cell actually provides the PUSCH occasions, PRACH occasions and/or RACH preambles to any concerned UE. The former may be associated with some uncertainty as each neighbouring cell may be guessing the original value of the timer, likely setting it to a sufficiently long original value. The latter would require some further inter-cell coordination, to inform the neighbouring cells when the timer has been actually started. Upon the expiry of the timer, the PUSCH occasions, PRACH occasions and/or RACH preambles may be discarded by the UE and also not guaranteed by the network. Then, in case of RLF, the UE may follow a legacy re-establishment procedure.

One or more aspects of this disclosure assume that a serving cell is given certain freedom and flexibility by several neighbouring cells with respect to those committed/reserved PUSCH occasions, PRACH occasions and/or RACH preambles. A subset of PUSCH occasions, PRACH occasions and/or RACH preambles originating from the neighbouring cells may continuously be committed/reserved and provided to the serving cell for its arbitrary use. The serving cell may be aware of measurements reported by individual UEs, and knowing their QoS requirements, may be free to use the subset of PUSCH occasions, PRACH occasions and/or RACH preambles proactively to configure those UEs. Those UEs may be at risk of RLF and/or may be most demanding UEs in terms of latency/reliability. That is, the serving cell may not be given full flexibility but may be instructed a subset of PUSCH occasions, PRACH occasions and/or RACH preambles that may be applied only for UEs with services from a list of allowed 5G QoS Indicators (5QIs). The PUSCH occasions, PRACH occasions and/or RACH preambles may be released by default when the UEs successfully complete a handover from the serving cell to a neighbouring target cell or complete a re-establishment to the neighbouring target cell. In general, it may not be so that a single UE from this group recovers/re-establishes/completes the handover and the entire configuration (for a neighbouring cell and all UEs within this neighbouring cell) is gone/discarded.

One or more aspects of this disclosure relate to a sequence of steps which a UE may prioritize in case it is provided with both PUSCH occasions for the two-step CBRA procedure or the two-step CFRA procedure with neighbouring cells and PRACH occasions and/or RACH preambles for the legacy CFRA procedure with neighbouring cells.

Additionally or alternatively, the UE may prioritize the legacy CFRA procedure with neighbouring target cell over the two-step CBRA procedure and over the two-step CFRA procedure with neighbouring target cell, in case the legacy CFRA procedure, the two-step CBRA procedure and the two-step CFRA procedure are supported by neighbouring target cell and PUSCH occasions are not exclusive (i.e. the same is declared to have been assigned to other UEs as well).

According to a first option, a UE may prioritize RACH preambles for the legacy CFRA procedure over PUSCH occasions for the two-step CBRA procedure and the two-step CFRA procedure when the PUSCH occasions are not exclusively assigned for this particular UE, but are shared with other UEs (e.g. as per the one-bit indication described above).

According to a second option, the UE may be configured with a quality/signal level threshold specific to a RS, such as an SSB. The quality/signal level threshold specific may be applicable only to the two-step CBRA procedure and the two-step CFRA procedure or may be applicable to the two-step CBRA procedure, the two-step CFRA procedure and the legacy CFRA procedure. The UE may be configured so that when measurements exceed the threshold, the UE may be allowed to use the PUSCH occasions to perform the two-step CBRA procedure or the two-step CFRA procedure (e.g. over a particular 'beam'). Otherwise, the UE may fallback to the legacy CFRA procedure (if supported and if the same threshold, as considered above, does not apply here). Otherwise, UE may fallback to the legacy CBRA procedure. The second option may be combined to the first option.

According to a third option, the UE may be configured with RACH preambles for two-step CFRA procedure. This may impact the decision process at the UE's side, which may prioritize the two-step CFRA procedure over the legacy CFRA procedure, provided a neighbouring target cell supports both.

This may impact the decision process at the UE's side, which will certainly prioritize the two-step CFRA procedure manner over legacy CFRA procedure, provided the selected neighbouring target cell supports both.

Figure 7:
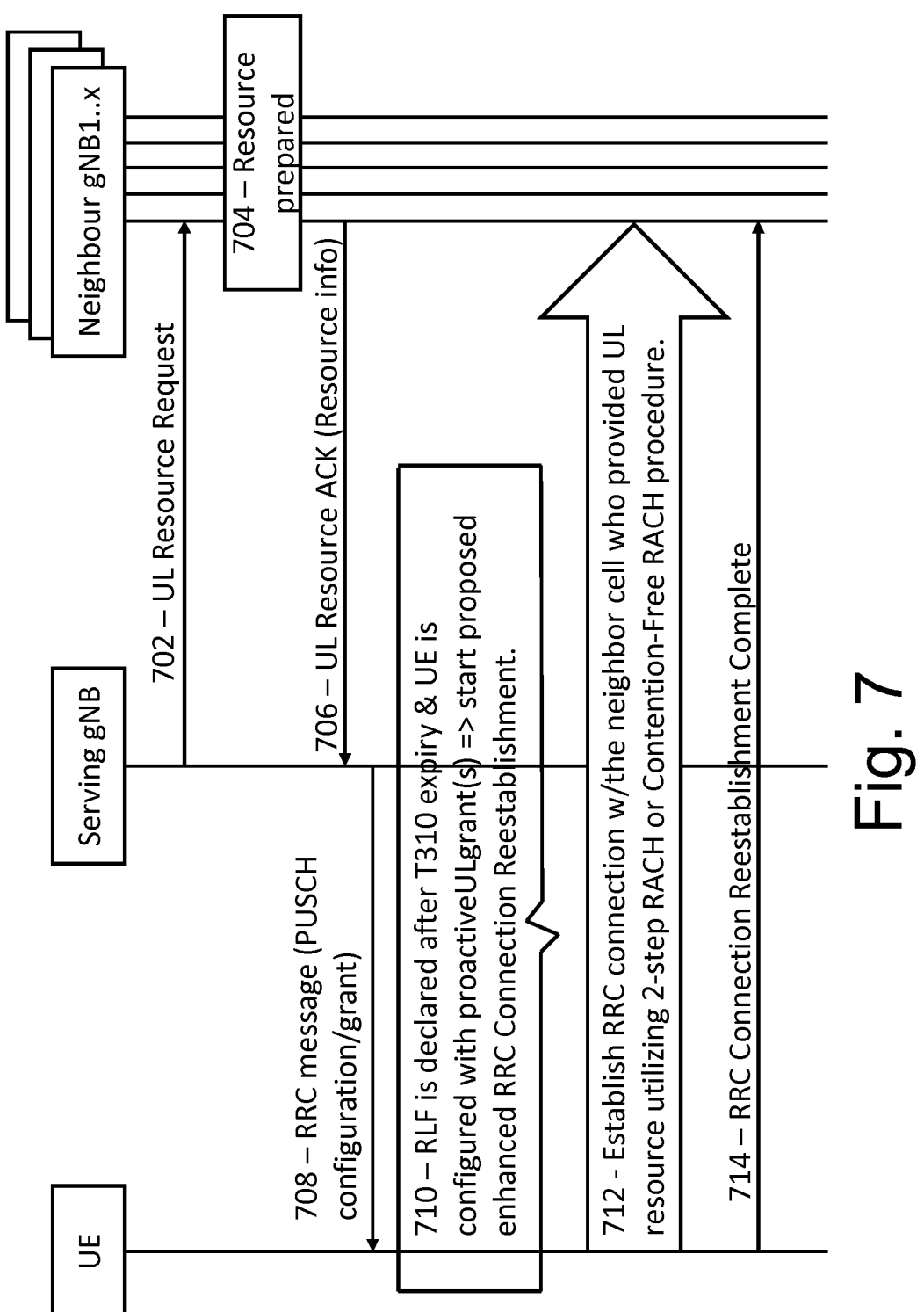
FIG. 7 shows a schematic representation of a signalling
diagram of a method of proactively preparing a random
access procedure, wherein the random access procedure is
performed as part of a radio resource control connection
re-establishment procedure in relation to a handover.

FIG. 7 shows a schematic representation of a signalling diagram of a method of proactively preparing a random access procedure, wherein the random access procedure is performed during a handover or RRC re-establishment procedure.

In step 702, a serving gNB (or alternatively eNB) may send a request to a neighbouring target gNB1 for PUSCH occasions, PRACH occasions and/or RACH preambles over Xn. The serving gNB may send the request to the neighbouring target gNB1 for PUSCH occasions, PRACH occasions and/or RACH preambles after it detects that the UE experiences degraded performance (e.g. lack of ACK/NACK or based on measurement reports). Alternatively, the serving gNB may send the request to the neighbouring target gNB1 for PUSCH occasions, PRACH occasions and/or RACH preambles in advance, if the network is capable of committing to long-term reservations.

In step 704, the neighbouring target gNB1 may commit/reserve/allocate PUSCH occasions, PRACH occasions and/or RACH preambles. The PUSCH occasions, PRACH occasions and/or RACH preambles may be shared or dedicated.

In step 706, the neighbouring target gNB1 may acknowledge the request and may send the PUSCH occasions, PRACH occasions and/or RACH preambles to the serving gNB over Xn.

In step 708, the serving gNB may send the PUSCH occasions, PRACH occasions and/or RACH preambles to a UE. The serving gNB may send a UE ID indicating which UE has been configured with the PUSCH occasions, PRACH occasions and/or RACH preambles.

In step 710, the UE and/or the serving gNB may detect a RLF (e.g. upon expiry of a timer). The UE may select a random access procedure among the two-step CFRA procedure, the two-step CBRA procedure and the legacy CFRA procedure based on the PUSCH occasions, PRACH occasions and/or RACH preambles and/or whether the UE and the neighbouring target gNB1 support the two-step CFRA procedure, the two-step CBRA procedure and the legacy CFRA procedure.

In step 712, the UE may perform the selected random access procedure with the neighbouring target gNB1 as part of a RRC connection re-establishment procedure.

In step 714, the UE may complete the RRC connection re-establishment procedure.

Figure 8:
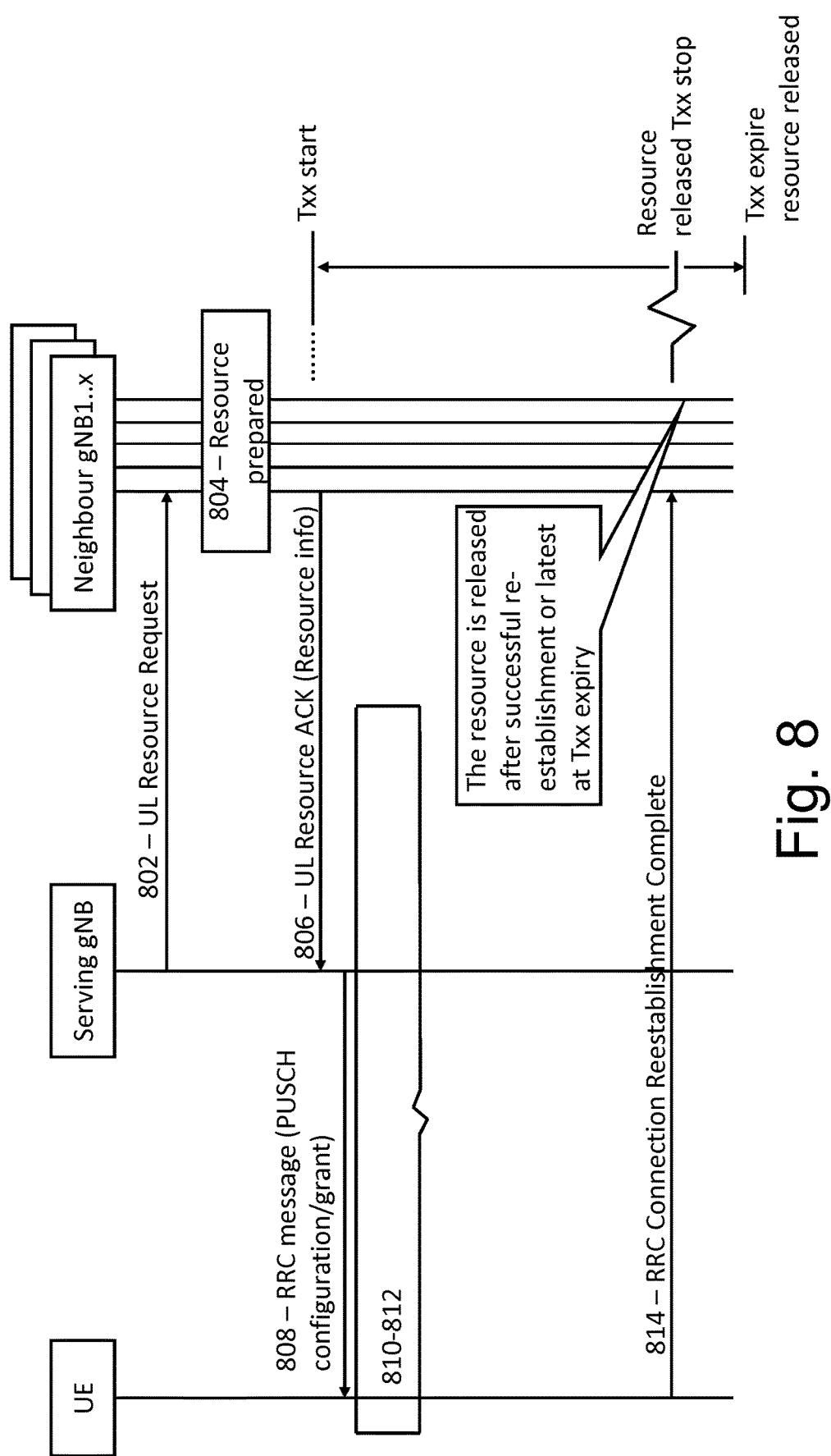
FIG. 8 shows a schematic representation of a signalling
diagram of a method of proactively preparing a random
access procedure, wherein the random access procedure is
performed as part of a radio resource control connection
re-establishment procedure and wherein a resource used
during the random access procedure is released after the
re-establishment procedure is completed or a timer expires.

FIG. 8 shows a schematic representation of a signalling diagram of a method of proactively preparing a random access procedure, wherein the random access procedure is performed during a handover or RRC connection re-establishment procedure and wherein a resource used during the random access procedure is released after the re-establishment procedure is completed or a timer expires.

In step 802, a serving gNB (or alternatively eNB) may send a request to a. neighbouring target gNB1 for PUSCH occasions, PRACH occasions and/or RACH preambles over Xn. The serving gNB may send the request to the neighbouring target gNB1 for PUSCH occasions, PRACH occasions and/or RACH preambles after it detects that the UE(s) experience degraded performance (e.g. lack of ACK/NACK or based on measurement reports). Alternatively, the serving gNB may send the request to the neighbouring target gNB1 for PUSCH occasions, PRACH occasions and/or RACH preambles in advance, if the network is capable of committing to long-term reservations.

In step 804, the neighbouring target gNB1 may commit/reserve/allocate PUSCH occasions, PRACH occasions and/or RACH preambles. The PUSCH occasions, PRACH occasions and/or RACH preambles may be shared or dedicated. In case of shared resources the release (by the neighbouring target gNB1) in subsequent step 814 may be conditional to other UEs no longer being expected to use the resource.

In step 806, the neighbouring target gNB1 may acknowledge the request and may send the PUSCH occasions, PRACH occasions and/or RACH preambles to the serving gNB over Xn. The neighbouring target gNB1 and/or the serving gNB may trigger a timer (e.g. Txx).

In step 808, the serving gNB may send the PUSCH occasions, PRACH occasions and/or RACH preambles to a UE. The. serving gNB may send an indication indicating whether there are other UEs configured with the same PUSCH occasions, PRACH occasions and/or RACH preambles and possibly how many of these other UEs.

In step 810, the UE and/or the serving gNB may detect an RLF (e.g. upon expiry of a timer) and may initiate an RRC connection re-establishment procedure with the neighbouring target gNB1. The UE may select a random access procedure among the two-step CFRA procedure, the two-step CBRA procedure and the legacy CFRA procedure based on the PUSCH occasions, PRACH occasions and/or RACH preambles and/or whether the UE and the neighbouring target gNB1 support the two-step CFRA procedure, the two-step CBRA procedure and the legacy CFRA procedure.

In step 812, the UE may perform the selected random access procedure with the neighbouring target gNB1) as part of the RRC connection re-establishment procedure.

In step 814, the UE may complete the handover or RRC connection re-establishment procedure before the timer (e.g. Txx) expires. The. neighbouring target gNB1 may release the PUSCH occasions, PRACH occasions and/or RACH preambles. The serving gNB or neighbouring target gNB1 may instruct the UE that the PUSCH occasions, PRACH occasions and/or RACH preambles are no longer available for its use.

Alternatively, in step 814 the UE may not complete the handover or RRC connection re-establishment procedure before the timer (e.g. Txx) expires. The neighbouring target gNB1 may release the PUSCH occasions, PRACH occasions and/or RACH preambles. The serving gNB or neighbouring target gNB1 may instruct the UE that the PUSCH occasions, PRACH occasions and/or RACH preambles are no longer available for its use.

FIG. 8 shows how the associated timer controlling the validity PUSCH UL grants/configurations and/or RACH preambles is operated. The timer (e.g. Txx) may alternatively be started when PUSCH occasions, PRACH occasions and/or RACH preambles are committed/reserved by the neighbouring target gNB1 or when PUSCH UL grants/configurations and/or RACH preambles are actually provided to the UE. In the latter case the serving gNB may inform the neighbouring target gNB1 over Xn when PUSCH occasions, PRACH occasions and/or RACH preambles were provided to the UE. In any case (i.e. regardless of whether the timer (e.g. Txx) has been initiated or not), PUSCH occasions, PRACH occasions and/or RACH preambles may be released when the UE completes handover or re-establishment. In case of shared resources, the release (by the target node) may be conditional to other UEs no longer needing the resource.

Figure 9:
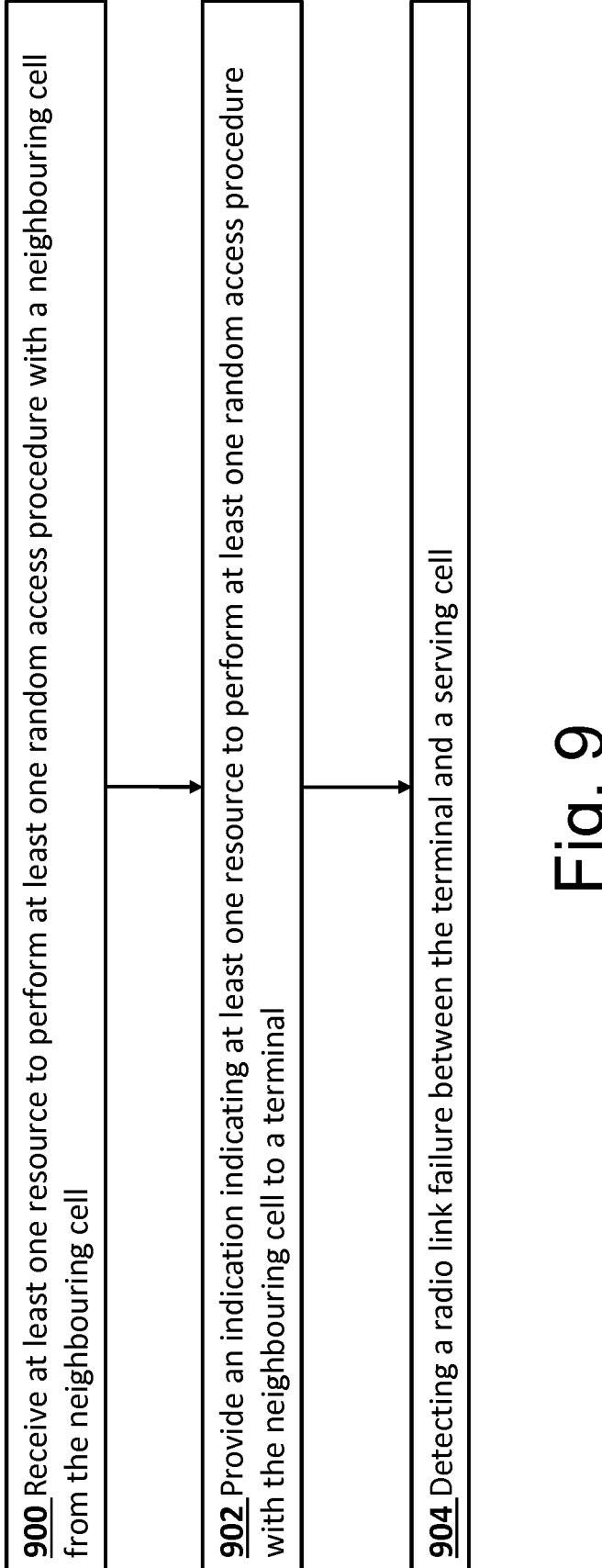
FIG. 9 shows a schematic representation of a block
diagram of a method of proactively preparing a random
access procedure performed by a serving cell.

FIG. 9 shows a schematic representation of a block diagram of a method of proactively preparing a random access procedure performed by a serving cell.

In step 900, the serving cell may receive at least one resource to perform at least one random access procedure with a neighbouring cell, prior to a radio link failure between the serving cell and a terminal. This step may be mapped to step 706 of FIG. 7 and step 806 of FIG. 8.

The at least one random access procedure may comprise at least one of (i) a two-step CBRA procedure, (ii) a two-step CFRA procedure or (iii) a legacy CFRA procedure.

The at least one resource may comprise PUSCH occasions, PRACH occasions and/or RACH preambles.

The at least one resource may comprise a dedicated resource or a shared resource.

The PRACH occasion the PUSCH occasion do not need to be adjacent in time or frequency, but they may be logically linked. The PRACH occasion indicates the time and frequency where RACH preambles may be sent.

The at least one resource may be associated with a threshold specific to a RS, such as an SSB.

The at least one resource may be valid for a limited duration. The limited duration may be determined by a timer (e.g. Txx) or by a completion of a handover or a re-establishment procedure by the terminal. Alternatively, the at least one resource may be valid for an unlimited duration.

The terminal may meet at least one of a quality of service requirement, a reliability requirement or a latency requirement to be selected for proactive preparation.

In step 902, the serving cell may provide an indication indicating the at least one resource to perform the at least one random access procedure with the neighbouring target cell to the terminal, prior to a radio link failure between the serving cell and the terminal. This step may be mapped to step 708 of FIG. 7 and step 808 of FIG. 8.

In step 904, the serving cell may detect the radio link failure between the serving cell and the terminal. This step may be mapped to step 710 of FIG. 7 and step 810 of FIG. 8.

Figure 10:
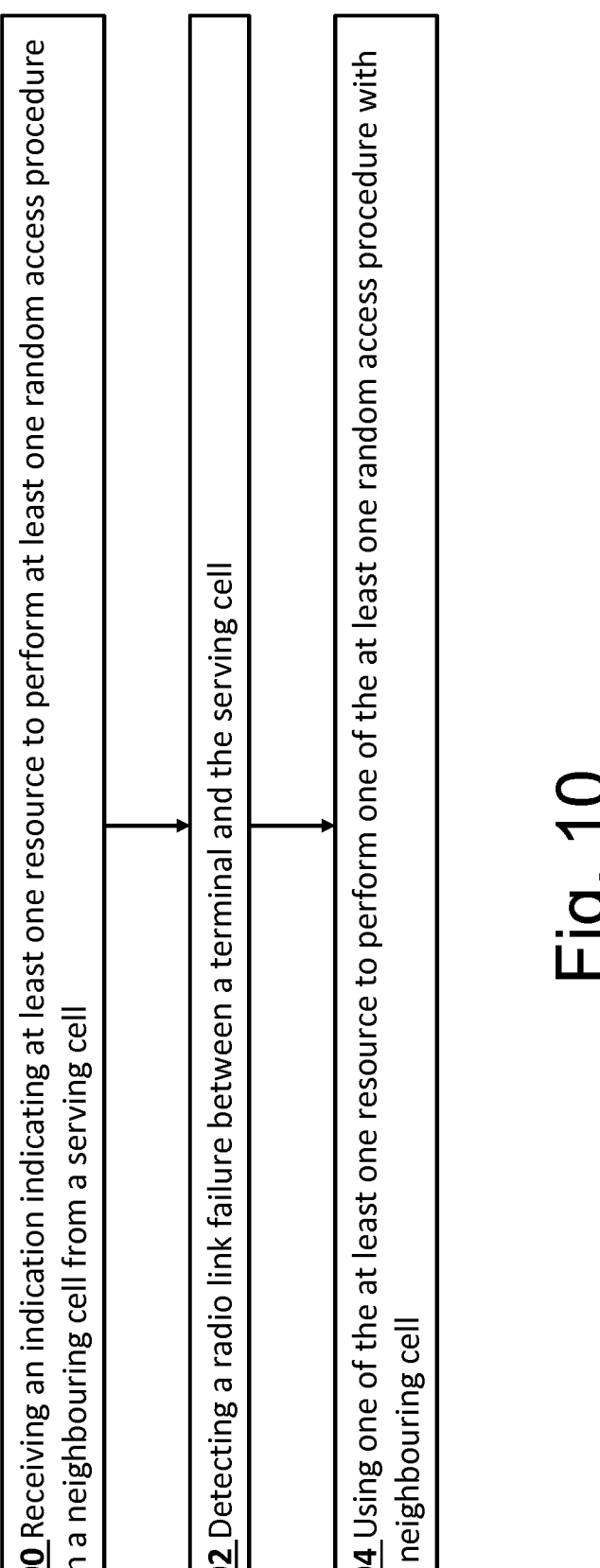
FIG. 10 shows a schematic representation of a block
diagram of a method of proactively preparing a random
access procedure performed by a terminal.

FIG. 10 shows a schematic representation of a block diagram of a method of proactively preparing a random access procedure performed by a terminal (e.g. UE).

In step 1000, the terminal (e.g. UE) may receive an indication indicating at least one resource to perform at least one random access procedure with a neighbouring cell from a serving cell, prior to a radio link failure between the serving cell and the terminal (e.g. UE). This step may be mapped to step 708 of FIG. 7 and step 808 of FIG. 8.

The at least one random access procedure may comprise at least one of (i) a two-step CBRA procedure, (ii) a two-step CFRA procedure or (iii) a legacy CFRA procedure.

The at least one resource may comprise PUSCH occasions, PRACH occasions and/or RACH preambles.

The at least one resource may comprise a dedicated resource or a shared resource.

The at least one resource may be associated with a threshold specific to a RS, such as an SSB.

The at least one resource may be valid for a limited duration. The limited duration may be determined by a timer (e.g. Txx). The timer may be predetermined in the standard or determined by the neighbouring cell. The timer may be stopped by a completion of a handover or a re-establishment procedure by the terminal. Alternatively, the at least one resource may be valid for an unlimited duration or until a new configuration is issued to a terminal.

The terminal may meet at least one of a quality of service requirement, a reliability requirement or a latency requirement to be selected for proactive preparation.

In step 1002, the terminal (e.g. UE) may detect the radio link failure between the serving cell and the terminal. This step may be mapped to step 710 of FIG. 7 and step 810 of FIG. 8.

In step 1004, the terminal (e.g. UE) may use one of the at least one resource to perform one of the at least one random access procedure with the neighbouring cell. This step may be mapped to step 712 of FIG. 7 and step 812 of FIG. 8.

In an implementation, the terminal (e.g. UE) may use a RACH preamble to perform (iii) a legacy (i.e. aligned with 3GPP Rel-15 specification) contention free random access channel procedure, when the at least one resource comprises: a shared PUSCH occasion to perform (i) a two-step contention based random access channel procedure or (ii) a two-step contention free random access procedure; and the RACH preamble to perform (iii) the legacy CFRA procedure.

The terminal (e.g. UE) may use a PUSCH occasion and/or a PRACH occasion to perform (i) a two-step CBRA procedure or (ii) a two-step CFRA procedure, when the at least one resource t comprises the PUSCH occasion and/or PRACH occasion to perform (i) the two-step CBRA procedure or (ii) the two-step CFRA procedure; and when the threshold specific to a RS, such as SSB, is met.

The terminal (e.g. UE) may use a PRACH occasion and/or RACH preamble to perform (iii) a legacy CFRA procedure, when the at least one resource comprises the PRACH occasion and/or the RACH preamble to perform (iii) the legacy CFRA procedure; and when the threshold specific to the RS, such as SSB, is not met.

The terminal (e.g. UE) may perform (iv) a legacy CBRA procedure, when the at least one resource does not comprise the PRACH occasion and/or the RACH preamble to perform (iii) the legacy CFRA procedure; and when the threshold specific to the RS, such as SSB, is not met.

Figure 11:
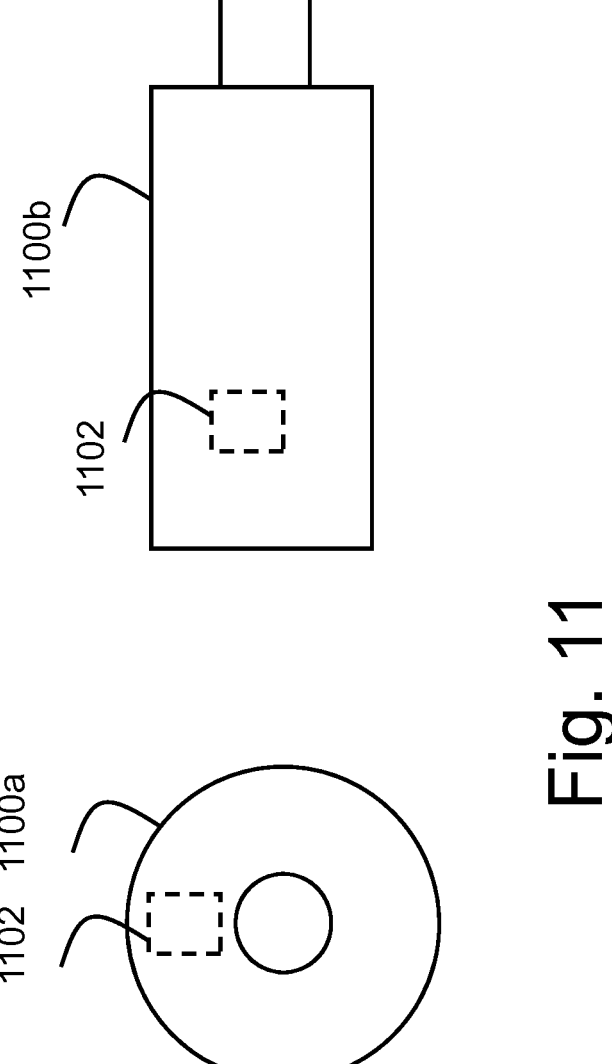
FIG. 11 shows a schematic representation of a non-
volatile memory medium storing instructions which when
executed by a processor allow a processor to perform one or
more of the steps of the above methods.

FIG. 11 shows a schematic representation of non-volatile memory media 1100a (e.g. computer disc (CD) or digital versatile disc (DVD) and 1100b (e.g. universal serial bus (USB) memory stick) storing instructions and/or parameters 1102 which when executed by a processor allow the processor to perform one or more of the steps of the above methods.

It is noted that while the above describes example embodiments, there are several variations and modifications which may be made to the disclosed solution without departing from the scope of the present invention.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A user equipment comprising:
at least one processor; and
at least one memory including computer program code;
the at least one memory and the computer program code configured to, with the at least one processor, cause the user equipment at least to:
prior to a radio link failure between a serving cell and the user equipment, receive from the serving cell, a configuration of at least one resource to perform a random access procedure with a neighbouring cell, wherein the at least one resource to perform the random access procedure comprises a dedicated resource or a shared resource, and wherein the at least one resource to perform the random access procedure is associated with a threshold specific to a reference signal;
detect a radio link failure between the serving cell and the user equipment; and
use the at least one resource configured prior to the radio link failure to perform the random access procedure with the neighbouring cell as part of a radio resource control connection re-establishment procedure, wherein the random access procedure is performed using the at least one resource configured prior to the radio link failure only when measurements on the reference signal are above the threshold; and perform a legacy contention based random access procedure when the at least one resource configured prior to the radio link failure does not comprise a random access preamble to perform a legacy contention free random access procedure and when the threshold specific to the reference signal is not met, wherein the user equipment is to acquire system information of the neighbouring target cell before performing the legacy contention based random access procedure.

2. The user equipment of claim 1, wherein the at least one resource comprises at least one of a physical uplink shared channel occasion, a physical random access channel occasion or a random access channel preamble.

3. The user equipment of claim 1, wherein the at least one memory and the computer program code are configured to, with the at least one processor, cause the user equipment at least to:

prior to a radio link failure between the serving cell and the user equipment, receive an indication indicating whether the at least one resource to perform the random access procedure comprises the dedicated resource or the shared resource from the serving cell.

4. The user equipment of claim 3, wherein the at least one memory and the computer program code are configured to, with the at least one processor, cause the user equipment at least to:

prior to a radio link failure between the serving cell and the user equipment, receive an indication indicating whether there are other user equipment configured with the same at least one resource to perform the random access procedure.

5. The user equipment of claim 1, wherein the at least one resource to perform the random access procedure is valid for a limited duration.

6. A method comprising:

prior to a radio link failure between a serving cell and a user equipment, receive, receiving, by the user equipment from the serving cell, a configuration of at least one resource to perform a random access procedure with a neighbouring cell, wherein the at least one resource to perform the random access procedure comprises a dedicated resource or a shared resource, and wherein the at least one resource to perform the random access procedure is associated with a threshold specific to a reference signal;

detecting a radio link failure between the serving cell and the user equipment; and using the at least one resource configured prior to the radio link failure to perform the random access procedure with the neighbouring cell as part of a radio resource control connection re-establishment procedure, wherein the random access procedure is performed using the at least one resource configured prior to the radio link failure only when measurements on the reference signal are above the threshold; and performing a legacy contention based random access procedure when the at least one resource configured prior to the radio link failure does not comprise a random access preamble to perform a legacy contention free random access procedure and when the threshold specific to the reference signal is not met, wherein the user equipment is to acquire system information of the neighbouring target cell before performing the legacy contention based random access procedure.

\* \* \* \* \*